Patented Nov. 18, 1952

2,618,596

UNITED STATES PATENT OFFICE 2,618,596

OIL SOLUBLE GELLING AGENT

Arthur Minich, Mountainside, and Milton Nowak, Union, N. J., assignors to Nuodex Products Co., Inc., Elizabeth, N. J., a corporation of New York No Drawing. Application June 7, 1950, Serial No. 166,782

6 Claims. (Cl. 252—8.55)

This invention is an agent designed to increase the consistency of many non-aqueous systems, such as hydrocarbons, oils, waxes, solvents, and the like for various use in different arts. The solvents may be hydrocarbons or halogenated hydrocarbons, etc. In increasing the consistency of such non-aqueous compositions, it is possible, through the use of the proper ratios of the agent of this invention, to obtain gels of many normally liquid compositions. It is essentially a matter of the percentage of the agent of this invention that is added to the composition that determines the degree of consistency increase. Non-flowing and solid gels may be obtained through the use of appropriate quantities of this agent.

There are various fields where the need for such gellified or high consistency systems has long been manifest. For example, the grease industry requires the use of such a gelling agent in the manufacture of certain greases. Similarly lubricating oils will often be benefited in their performance by the addition of an appropriate gelling agent. Another distinct field of utility for such an agent is in the art of coating materials where it may be desired, where applying a priming coat upon a porous surface, such as a new plaster wall, to prevent the penetration of the coating material into the substrate.

One use for solid gels of kerosene fuel is for the purpose of safer and easier manipulation in connection with the starting of fires in large coal burning furnaces.

A very important use of the agent of this invention is its employment to solidify petroleum hydrocarbons for use in increasing the flow of oil wells. In this field, gellified hydrocarbons may be used to advantage as pressure transmitting media to crack subterranean stone formations. In such applications, ungelled hydrocarbons can not perform efficiently in transmitting applied pressure because the rock formations are too porous to retain liquid petroleum hydrocarbons. Through the use of the gelling agent of this invention, the liquid petroleum hydrocarbon is caused to gel to a point where it has the necessary elasticity to transmit the hydraulic pressures, without penetrating into the porous rock formation.

We are aware that heretofore other gelling agents have been known and have been used for various purposes, although not necessarily for the purposes herein specified. One example of a gelling agent which has proved to be of high efficiency for particular uses is that disclosed in Patent No. 2,390,609, issued December 11, 1945, to Nuodex Products Co., Inc., as assignee of Arthur Minich. That patent discloses the use of an aluminum soap of naphthenic and certain other organic acids.

The object of the present invention is to improve upon the gelling agent of the said Minich patent and all other gelling agents heretofore used, to the end that a highly efficient agent be provided adapted for an unusually wide field of use and not limited to particular fields as has heretofore almost universally been the case.

We have discovered after extended research and tests that a substantially universal gelling agent may be produced from a combination of two commercially available, economical acids, namely tall oil and coconut acids. When the hydroxy aluminum soaps of either of these acids are produced singly, they cannot be employed as universal gelling agents for the purposes stated, for neither will yield gels in all systems. The wholly unexpected and surprising result of a hydroxy aluminum soap of a combination of these two acids is that it is highly effective in producing gels in a wide variety of non-aqueous systems. The soap resulting from the mixture of the two acids in question constitutes a multiple soap and not a mixture of the independent soaps, for tests have demonstrated that a mixture of the independently produced soaps of these acids will not produce the gel that is produced by the multiple salt of this invention. The soap of the present invention does not constitute the aggregate of separate interactions of the separate acids with the aluminum raw material but rather the combined and novel interaction of the two with the aluminum raw material to form the end product soap of this invention. There is no question that the end product of this invention is a new compound.

The following examples are illustrative of the processes of compounding and the end product of this invention.

EXAMPLE 1

*Preparation of a multiple monohydroxy aluminum soap of a combination of 66⅔% tall oil and 33⅓% coconut fatty acid*

5 liters of water are placed in a suitable vessel (a 3 gallon pail or battery jar) and 267 grams of a 30% caustic soda solution are added. The solution is then agitated while there is added a combination of 181 grams of coconut fatty acids (acid No. 246) and 362 grams of distilled tall oil (acid No. 186). The soap solution thus formed is checked to ascertain its neutrality, and, if necessary, is adjusted to form a neutral soap by addition of either caustic soda or acid (a 2:1 combination of tall oil and coconut fatty acid). There is then added 133 grams of a 30% caustic soda solution. This is followed by the addition of a solution of 308 grams of aluminum sulfate (8.8% aluminum) in 600 grams of water. This solution is added slowly in a steady stream over a period of one-half hour. A white precipitate is formed consisting of the multiple monohydroxy aluminum soap of tall oil-coconut fatty acid combination. The precipitate is filtered off and washed with 1,000 cc. of water. The caked precipitate is then broken into small lumps and dried on trays in a forced draft oven at 140° F. for 15 hours.

The dried material may be powdered if desired.

The product forms gels in kerosene, mineral spirits, benzene, toluene, mineral oils. For example, 18 gm. of the powdered product were added to 300 gm. of kerosene at 85° F. and agitated constantly. The kerosene slowly gelled and after 20 to 40 minutes attained a viscosity of over 1000 centipoises as determined in a Stormer viscosimeter, using the technique and equipment commonly employed in measuring viscosities of oil well drilling muds. The gel gradually increased in viscosity for about 12 hours, when it reached its maximum. It retained this maximum viscosity indefinitely on storage.

10 gm. of the powdered product were added to 100 gm. of dichlorobutane, and the mixture agitated. After 1 hour, a stiff gel was formed.

10 gm. of the powdered product were added to 100 gm. of mineral oil and the mixture agitated while being maintained at a temperature of 160° F. After two hours, a very viscous solution was obtained that became a stiff gel on cooling to room temperature.

The process of Example 1 deals with one particular mode of preparation of the agent of this invention. However, we are aware of other procedures which will produce the end products. For example, instead of carrying out the drying of the multiple aluminum soap as such, it has been found practical to introduce an aqueous slurry of the precipitated multiple salt (without having gone through a drying cycle) into a vehicle, the consistency of which is to be modified. Subsequent application of either vacuum or of vacuum coupled with elevated temperature, or of elevated temperatures alone, will result in a solution of the dehydrated multiple aluminum soap in said vehicle.

Another process of manufacture of the multiple aluminum soap of this invention is that wherein the caustic soda, referred to in Example 1, is replaced wholly or in part by sodium carbonate. Part of the sodium carbonate may be dissolved in the aluminum sulphate solution instead of the soap solution.

Another modification of the process of Example 1 consists in the substitution, for the aluminum sulphate of other suitable water-soluble aluminum raw material salts.

Moreover, the process of Example 1 has been described as a batch method, but we are aware that the end product may be produced by continuous process.

In addition to the particular ratio of the two raw material acids to each other indicated in Example 1, we have also investigated many other ratios of said acids to each other. We have demonstrated that satisfactory multiple hydroxy aluminum soaps, suitable as universal gelling agents, may be prepared from the combination of tall oil and coconut acids within the limits of 20–80% tall oil to 80–20% coconut acids. In other words, of the combined acid quantity used in the manufacture of the multiple aluminum soap of this invention, there may be present as little as 20% of one acid and as much as 80% of the other acid.

The examples shown hereinafter are illustrative of the operative range of such ratios of the two acid raw materials to each other.

EXAMPLE 2

*Multiple hydroxy aluminum soap of combination of 20% tall oil and 80% coconut fatty acids*

400 gm. of 30% caustic soda solution are added to 5 liters of water in a 3 gallon stainless steel pail. The solution is then agitated and a combination of 96 gm. of tall oil (A. N. 186) and 384 gm. of coconut oil fatty acids (A. N. 246) are added. When the solution is homogeneous, there is added slowly in a steady stream a solution of 308 gm. of aluminum sulphate (8.8% Al) in 600 gm. of water. A white precipitate is formed. After completion of the reaction, the product is filtered off, washed with 1 to 2 liters of water, broken into small lumps and dried for 16 hours at 130° F. The dried material, consisting of the multiple monohydroxy aluminum soap of the tall oil-coconut fatty acid combination may then be comminuted if desired.

24 gm. of the end product were placed in 300 gm. of kerosene at 80° F., and the mixture agitated. After 6 hours the mixture set to form a non-flowing transparent gel.

EXAMPLE 3

*Multiple hydroxy aluminum soap of combination of 80% tall oil and 20% coconut fatty acids*

568 gm. of a mixture of 80% tall oil (A. N. 186) and 20% coconut fatty acids (A. N. 246) are added to 5 liters of water containing dissolved therein 120 gm. of sodium hydroxide while agitating rapidly. When a homogeneous solution is obtained, agitation is continued while adding slowly a solution of 308 gm. of aluminum sulphate (8.8% Al) in 600 cc. of water. A white precipitate is formed. After reaction is complete, the precipitate is filtered, washed with 1000 cc. water and dried at 130° F. for 16 hours. The dried material, consisting of the multiple monohydroxy aluminum soap of a combination of tall oil and coconut oil fatty acids may then be comminuted if desired.

24 gm. of the end product was added to 300 gm. of kerosene and the mixture agitated; after 6 hours, a viscous gel was formed.

EXAMPLE 4

*Multiple monohydroxy aluminum soap of combination of 50% tall oil and 50% coconut oil fatty acid*

500 gm. of a mixture of 50% tall oil (A. N. 186) and 50% coconut oil fatty acids (A. N. 262) are added to 5 liters of water containing dissolved therein 120 gm. of NaOH while agitating rapidly. When a homogeneous solution is obtained, agitation is continued while adding slowly a solution of 308 gm. aluminum sulphate (8.8% Al) in 600 cc. of water. A white precipitate is formed. After reaction is complete, the precipitate is filtered off and washed with 1000 cc. water. It is then broken into small lumps and dried at 130° F. for 16 hours. The dried product, a multiple monohydroxy aluminum salt of a tall oil-coconut fatty acid combination may then be comminuted if desired.

6 gm. of the end product were added to 100 gm. of kerosene and the mixture agitated. After two hours a stiff gel was obtained.

6 gm. of the end product were added to 100 gm. of benzol and the mixture agitated. After 1 hour a stiff gel was formed.

The foregoing examples demonstrate that the combination of coconut and tall oil acids within the ratios 20–80% and 80–20% yield multiple hydroxy aluminum soaps of very satisfactory solubility and effectiveness for the purposes stated, whereas it can be clearly demonstrated that the singly produced hydroxy aluminum soaps of either of these acids are ineffective for these purposes.

The following examples are illustrative of this latter fact.

EXAMPLE 5

*Monohydroxy aluminum soap of coconut fatty acids*

120 gm. of sodium hydroxide are dissolved in 5 liters of water and the solution agitated while adding 456 gm. of coconut fatty acids (A. N. 246). When the solution is homogeneous, there is added, slowly, a solution of 308 gm. of aluminum sulphate (8.8% Al) in 600 cc. water. When precipitation is complete, the product is filtered off, washed with 1000 cc. of water and dried at 130° F. for 16 hours. The product, the monohydroxy aluminum soap of coconut fatty acids may then be comminuted, if desired.

10 gm. of the end product were added to 100 gm. of kerosene and the mixture agitated. No gel was formed after 24 hours constant agitation.

EXAMPLE 6

*Monohydroxy aluminum soap of tall oil*

120 gm. of sodium hydroxide are dissolved in 5 liters of water and 604 gm. of tall oil (A. N. 186) are added while agitating vigorously. When the solution is homogeneous, add a solution of 308 gm. aluminum sulphate (8.8% Al) in 600 cc. water. A white precipitate is formed. At the completion of the reaction, the precipitate is filtered off and washed with 1000 cc. water. The filter cake is then broken into small lumps and dried at 130° F. for 16 hours in a forced draft oven. The dried product, consisting of the monohydroxy aluminum soap of tall oil may then be comminuted, if desired.

10 gm. of the end product were added to 100 gm. of kerosene, and the mixture agitated. After 24 hours no gel was formed.

10 gm. of the end product were added to 100 gm. of toluene and the mixture agitated. After 24 hours, no gelation occurred.

In all of the foregoing examples, monohydroxy aluminum soaps have been employed. It is possible, however, to prepare from the tall oil-coconut acids combinations multiple hydroxy aluminum soaps of varying degrees of bascity ranging from $Al\ acid_1\ (OH)_2$ to $Al\ acid_2\ (OH)_1$. In this schematic formulae "acid" refers to a monovalent carboxylic acid, or a plurality of monovalent carboxylic acids. To illustrate the variation in bascity within said structural formulae, the following are cited:

EXAMPLE 7

*Multiple dihydroxy aluminum salt of a combination of 66⅔% tall oil and 33⅓% coconut fatty acids*

120 gm. of sodium hydroxide are dissolved in 5 liters of water and the solution agitated while adding a combination of 90.5 gm. coconut fatty acids (A. N. 246) and 181 gm. tall oil (A. N. 186). When a homogeneous solution is formed, there is added an aluminum sulfate solution consisting of 308 gm. aluminum sulphate (8.8% Al) in 600 cc. of water. A white precipitate is formed. When the reaction is complete, the precipitate is filtered off, washed with 1000 cc. of water, broken into small lumps and dried at 130° F. for 16 hours. The product, the multiple dihydroxy aluminum salt of the tall oil-coconut fatty acid combination may then be comminuted, if desired.

6 gm. of the end product were added to 100 gm. of kerosene and the mixture agitated. After 3 hours a stiff gel was formed.

EXAMPLE 8

*Multiple dihydroxy aluminum soap of a combination of 50% tall oil and 50% coconut fatty acids*

120 gm. of sodium hydroxide are dissolved in 5 liters water and 250 gm. of a combination of 50% tall oil (A. N. 186) and 50% coconut fatty acids (A. N. 262) are added. The solution is agitated until it is homogeneous. There is then added, a solution of 308 gm. aluminum sulphate (8.8% Al) in 600 cc. water, while agitating constantly. When the reaction is complete, the precipitate, consisting of the multiple dihydroxy aluminum soap of the tall oil-coconut fatty acid combination is filtered off, washed with 1000 cc. of water and dried in a forced draft oven at 130° F. for 16 hours.

The dried product may then be comminuted, if desired.

6 gm. of the end product multiple dihydroxy aluminum soap were placed in 100 gm. of kerosene and the mixture agitated; a stiff gel was formed in 3 hours.

In all of the examples heretofore cited, the steps described have been employed. We are cognizant, however, that many variations thereof may be practiced. For example, precipitation may be carried out at different concentrations of the reactants in the water medium; the precipitate may be dried at varying temperatures according to the type of drying apparatus available and with or without vacuum application. Also alkalis other than caustic soda, such as potassium hydroxide, ammonium hydroxide, triethanolamine, and equivalents may be utilized in the successful preparation of the end product.

We have hereinbefore referred to coconut acids and to tall oil acids. These acids represent commercially available acids of commercial quality. They are considered as entities for practical applications by those skilled in the art. We have employed various grades of each of these "practical entities" with complete satisfaction in the production of the end product of this invention.

The foregoing detailed description sets forth the invention in its preferred practical form, but the invention is to be understood as fully commensurate with the appended claims.

Having thus fully described the invention, what we claim as new and desire to secure by Letters Patent is:

1. A homogeneous, multiple, hydroxy-aluminum soap of a mixture of tall oil and coconut acids, said acids being in the ratio of not less than 20% of one of these acids to not more than 80% of the other.

2. A homogeneous, multiple, hydroxy-aluminum soap as claimed in claim 1 wherein the soap is a monohydroxy soap.

3. A homogeneous, multiple, hydroxy-aluminum soap as claimed in claim 1 wherein the soap is a dihydroxy soap.

4. A homogeneous, multiple, hydroxy-aluminum soap as claimed in claim 1 wherein there is twice as much tall oil as coconut acid.

5. A homogeneous, multiple, hydroxy-aluminum soap as claimed in claim 1 wherein the soap is a monohydroxy soap and wherein there is twice as much tall oil as coconut acid.

6. A hydraulic pressure transmitting hydrocarbon fluid useful in the fracturing of subterranean stone formations, said fluid containing a homogeneous, multiple, hydroxy aluminum soap of a mixture of tall oil and coconut acid in the ratio of not less than 20% of one of these acids to not more than 80% of the other.

ARTHUR MINICH.
MILTON NOWAK.

REFERENCES CITED

The following references are of record in the file of this patent:

UNITED STATES PATENTS

| Number | Name | Date |
|---|---|---|
| 1,942,636 | Bennett | Jan. 9, 1934 |
| 2,252,658 | Bigelow | Aug. 12, 1941 |
| 2,267,148 | Boner | Dec. 23, 1941 |
| 2,390,609 | Minich | Dec. 11, 1945 |
| 2,417,071 | Gebhart et al. | Mar. 11, 1947 |
| 2,447,064 | Gebhart et al. | Aug. 7, 1948 |
| 2,528,803 | Umkefer | Nov. 7, 1950 |

OTHER REFERENCES

Hydrafrac Process, J. B. Clark, pages 76–79 of "Oil and Gas Journal," October 1948.